US012352226B2

(12) United States Patent
Fachechi

(10) Patent No.: US 12,352,226 B2
(45) Date of Patent: Jul. 8, 2025

(54) COMPACT EGR VALVE

(71) Applicant: Stanadyne Operating Company LLC, Jacksonville, NC (US)

(72) Inventor: Nicola Fachechi, Royal Oak, MI (US)

(73) Assignee: Stanadyne Operating Company LLC, Jacksonville, NC (US)

( * ) Notice: Subject to any disclaimer, the term of this patent is extended or adjusted under 35 U.S.C. 154(b) by 226 days.

(21) Appl. No.: 17/975,810

(22) Filed: Oct. 28, 2022

(65) Prior Publication Data

US 2023/0140167 A1    May 4, 2023

Related U.S. Application Data

(60) Provisional application No. 63/273,110, filed on Oct. 28, 2021.

(51) Int. Cl.
*F02M 26/54*  (2016.01)
*F02M 26/50*  (2016.01)
(Continued)

(52) U.S. Cl.
CPC ............ *F02M 26/54* (2016.02); *F02M 26/50* (2016.02); *F02M 26/70* (2016.02); *F02M 26/72* (2016.02);
(Continued)

(58) Field of Classification Search
CPC ........ F02M 26/54; F02M 26/50; F16K 3/246; F16K 31/504; F16K 49/005
See application file for complete search history.

(56) References Cited

U.S. PATENT DOCUMENTS 3,488,030 A * 1/1970 Hulme .................. F16K 31/046
                                                251/129.05
4,463,930 A    8/1984 Vamvakas
(Continued)

FOREIGN PATENT DOCUMENTS

CN    112901793 A    6/2021
EP    2768125 A2    8/2014
(Continued)

OTHER PUBLICATIONS

PCT International Search Report and Written for International Application No. PCT/US2022/048158 filed Oct. 28, 2022; Date of Mailing: Feb. 17, 2023; 13 pgs.
(Continued)

*Primary Examiner* — Michael R Reid
(74) *Attorney, Agent, or Firm* — Alix, Yale & Ristas, LLP

(57) ABSTRACT

A compact EGR valve uses a BLDC motor to drive a valve member between a closed position blocking flow of exhaust gases and a range of open positions where exhaust gasses flow through the valve. A drive mechanism includes a nut in a fixed position and a screw arranged to rotate within the nut so that rotation of the screw causes the screw to move axially relative to the nut. The screw is coupled to a valve member and the valve member moves axially and rotationally with the screw. The screw slides along the length of a motor shaft as the screw moves axially relative to the nut and motor. Rotation of the valve member within the valve chamber during axial movement aids in removal of deposits that may accumulate within the valve housing.

14 Claims, 10 Drawing Sheets
(2 of 10 Drawing Sheet(s) Filed in Color)

(51) Int. Cl.
  *F02M 26/70* (2016.01)
  *F02M 26/72* (2016.01)
  *F16K 3/24* (2006.01)
  *F16K 31/50* (2006.01)
  *F16K 49/00* (2006.01)

(52) U.S. Cl.
  CPC .............. *F16K 3/246* (2013.01); *F16K 31/50* (2013.01); *F16K 49/005* (2013.01)

(56) References Cited

U.S. PATENT DOCUMENTS

| | | | |
|---|---|---|---|
| 4,540,022 A | 9/1985 | Cove | |
| 4,681,613 A | 7/1987 | Porter | |
| 4,825,906 A | 5/1989 | Hartman | |
| 4,969,628 A | 11/1990 | Reich et al. | |
| 6,105,614 A | 8/2000 | Bohaychuk et al. | |
| 6,492,753 B2 | 12/2002 | Zepp et al. | |
| 6,555,941 B1 | 4/2003 | Zepp et al. | |
| 6,943,478 B2 | 9/2005 | Zepp et al. | |
| 7,042,128 B2 | 5/2006 | Zepp et al. | |
| 7,104,523 B2 * | 9/2006 | Busato | F02M 26/54 123/568.21 |
| 7,482,717 B2 | 1/2009 | Hochhalter et al. | |
| 7,607,638 B2 * | 10/2009 | Wilson | F02M 26/50 123/568.24 |
| 7,633,197 B2 | 12/2009 | Soda et al. | |
| 7,746,013 B2 | 6/2010 | Fernengel et al. | |
| 7,839,108 B2 | 11/2010 | Patel et al. | |
| 8,487,575 B2 | 7/2013 | Yeh et al. | |
| 2005/0218727 A1 | 10/2005 | Gandel et al. | |
| 2006/0238039 A1 | 10/2006 | Niedermeyer et al. | |
| 2009/0229583 A1 | 9/2009 | Kotooka et al. | |
| 2010/0148605 A1 | 6/2010 | Moore et al. | |
| 2020/0158258 A1 | 5/2020 | Maruyama et al. | |

FOREIGN PATENT DOCUMENTS

| | | |
|---|---|---|
| EP | 3502531 A1 | 6/2019 |
| EP | 3686467 A1 | 7/2020 |
| WO | 2019210955 A1 | 11/2019 |

OTHER PUBLICATIONS

"Calculating BLDC Stator Temperature and Relationships with other Parameter"; Yang et al.; International Research Journal of Engineering and Technology (IRJET); vol. 06 Issue: 3; Mar. 2019; www.irjet.net; e-ISSN: 2395-0056; p-ISSN: 2395-0072; Impact Factor value: 7.211; ISO 9001:2008 Certified Journal; pp. 2058-2062; 5 pgs.

"Temperature Estimation of Stator Winding in Permanent Magnet Synchronous Motors Using d-Axis Current Injection"; Jun et al.; energies; MDPI; Received: Jul. 9, 2018; Accepted; Jul. 30, 2018; Published: Aug. 6, 2018; Energies 2018, 11, 2033; doi: 10.3390/en11082033; www.mdpi.com/journal/energies; pp. 1-14.

"Analysis of the Effect of the Motor Temperature to Brushless Direct Current Motor Performance on KARLING Electric Vehicle"; Garniwa et al.; Conference Paper Apr. 24, 2019; https://www.researchgate.net/publication/332622289; 9 pgs.

PCT International Search Report and Written Opinion for International application No. PCT/US2021/013246 filed Jan. 13, 2021; Date of Mailing: Apr. 13, 2021; 13 pgs.

* cited by examiner

COMPACT EGR VALVE

BACKGROUND

Aspects of the disclosure relate to a compact exhaust gas recirculation (EGR) valve.

It is well known in the field of automotive engineering and in particular in connection with emissions and fuel efficiency improvements in internal combustion engines to provide an exhaust-gas recirculation system. An EGR valve regulates the flow of exhaust gases to the engine intake system, resulting in increased engine efficiency, reduced fuel consumption and lower nitrogen oxide pollutant emissions. EGR valves operate in a high heat environment and are exposed to exhaust gasses that can accumulate carbon deposits on the valve, resulting in failure.

SUMMARY OF THE INVENTION

A compact EGR valve uses a BLDC motor to drive a valve member between a closed position blocking flow of exhaust gases and an open position where exhaust gasses flow through the valve. A drive mechanism includes a nut in a fixed position and a screw arranged to rotate within the nut so that rotation of the screw causes the screw to move axially relative to the nut. The screw is coupled to a valve member so that the valve member moves axially and rotationally with the screw. The shaft of the motor has at least one flat or non-round feature that applies rotational force to the screw, and the cross-sectional configuration of the shaft is constant, allowing the screw to slide along the length of the shaft as the screw moves axially relative to the nut and motor. The valve member has a cylindrical side surface that is guided within a cylindrical portion of a valve chamber. Rotation of the valve member within the valve chamber during axial movement aids in removal of deposits that may accumulate within the valve housing.

According to a preferred embodiment, the inlet to the valve chamber is rectangular and laterally offset from a longitudinal axis of the valve chamber. The valve chamber includes a hemispherical portion extending from the cylindrical portion and the outlet opening of the valve is at least partially defined in the hemispherical portion of the valve chamber.

A disclosed valve comprises a valve housing defining a valve chamber with an inlet opening communicating with a cylindrical portion of the valve chamber and an outlet opening communicating with the cylindrical portion of the valve chamber. A valve member having a cylindrical side wall and an annular leading edge is arranged in the cylindrical portion of the valve chamber. The valve member is moveable between a closed position where the cylindrical side wall covers the inlet opening and a range of open positions where the cylindrical side wall does not cover the inlet opening.

An embodiment of the disclosed valve includes a drive mechanism including a screw coupled to the valve member for axial and rotational movement with the valve member, said screw having a first thread on an outside surface and defining an axial bore. A nut secured in a fixed position and having a second thread engaged with the first thread so that rotation of the screw moves the screw and the valve member axially relative to the nut while rotating the valve member within the cylindrical portion of the valve chamber. A motor has a shaft received within the screw, the shaft having a constant non-round configuration along its length, said motor shaft received in the bore defined by the screw. Rotation of the motor shaft rotates the screw relative to the nut to move the screw and valve member axially relative to the nut and motor. The screw sliding along the shaft as the valve member moves axially between the closed position and the open position, said valve member rotating with the motor shaft and screw during axial movement.

The disclosure also includes a method of regulating gas flow through a valve comprising simultaneously rotating and moving a valve member having a cylindrical side wall in a cylindrical valve chamber between a closed position wherein the cylindrical side wall covers a radial opening in the cylindrical valve chamber and a range of open positions wherein the cylindrical side wall uncovers at least a portion of the radial opening in the cylindrical valve chamber. The cylindrical valve member includes an annular leading edge that removes deposits from an inside surface of the cylindrical valve chamber as the valve member rotates and moves axially from the range of open positions to the closed position.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
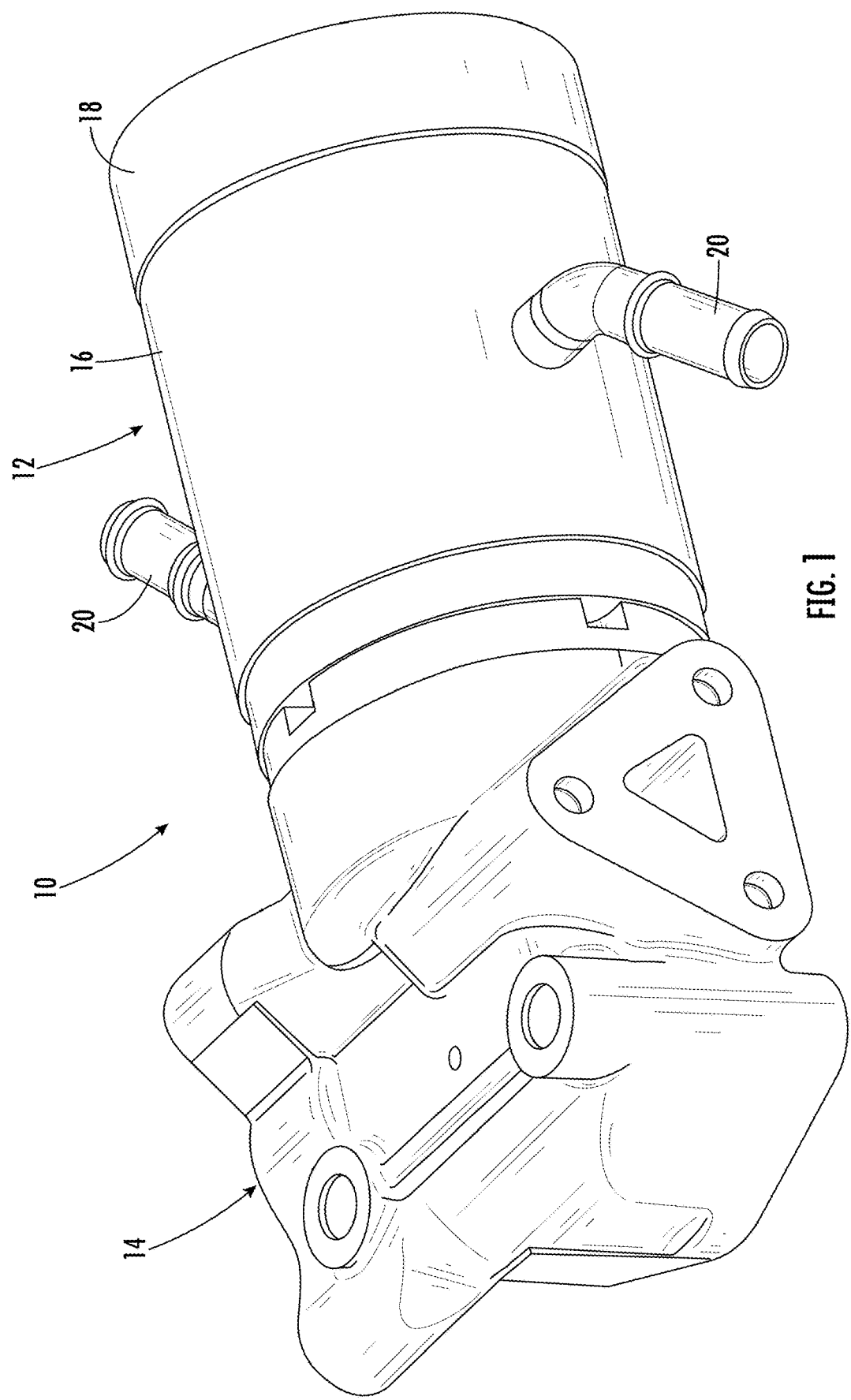
FIG. 1 is an exterior perspective view of an embodiment of a compact EGR valve according to aspects of the disclosure.

Embodiments of a compact EGR valve will be described with reference to FIGS. 1-13. FIG. 1 is an exterior perspective view of an embodiment of a compact EGR valve 10 according to aspects of the disclosure. The compact EGR valve 10 includes a motor assembly 12 and a valve housing 14 configured to attach the compact EGR valve 10 to exhaust flow passages in an internal combustion engine (not shown). The motor assembly 12 includes a brushless direct current (BLDC) motor 32 surrounded by a cooling jacket 16 through which engine coolant is circulated to cool the BLDC motor 32. An end cap 18 covers a torsion spring 50 connected to one end of a shaft 34 of the BLDC motor to counterrotate the rotor 33 of the BLDC motor 32 to return the valve member to a closed position when power is removed from the BLCD motor. Cooling fittings 20 connect the cooling jacket 16 to the coolant circulation system of the internal combustion engine (not shown). The motor assembly 12 includes the BLDC motor, cooling jacket 16, end cap 18, torsion spring 50, and cooling fittings 20. The construction and function of a BLDC motor is well-understood and need not be explained in detail here. For the purposes of this disclosure, the BLDC motor has a stator 35 arranged in a fixed position with respect to a motor housing. The stator 35 includes a plurality of coils arranged in groups (phases) around a cylindrical central space occupied by the rotor 33. The rotor 33 is supported for rotation within the stator 35 on a motor shaft 34 that projects from both ends of the rotor 33. The rotor 33 includes permanent magnets 37 arranged on an outer periphery of the rotor and radially adjacent to the stator coils. A motor control circuit 41 sequentially applies electrical power to the groups of coils in the stator to produce a rotating magnetic field that acts on the magnets in the rotor to produce torque that rotates the rotor within the stator. An electrical connector 39 connects the motor control circuit 41 to the BLDC motor 32. The motor control circuit 41 is also connected to an engine control unit (ECU) or emissions control system to receive signals to actuate the BLDC motor 32 to position the valve member 22 to provide a desired flow of exhaust gasses between the inlet 62 and outlet 54 openings in the valve chamber 56.

At one end, the motor shaft 34 is coupled to the torsion spring 50 so that powered rotation of the rotor 33 winds the torsion spring 50. The other end of the motor shaft 34 is coupled to the valve member drive mechanism 24 so that powered rotation of the rotor 22 causes the valve actuation mechanism 24 to move the valve member 22 from a closed position toward an open position within the valve housing 14. When power is removed from the stator coils, the torsion spring 50 unwinds to return the valve member 22 to the closed position. In one embodiment, the valve 10 is configured to recirculate exhaust gasses produced by an internal combustion engine back to the intake of the engine, which can reduce emissions produced by the engine. In the closed position of the valve 22, no exhaust gasses are recirculated to the intake and in the open position, a pre-determined maximum flow of exhaust gasses are recirculated to the intake. The disclosed BLDC motor 32 is selected to produce torque to position the valve member 22 at any position between the closed and fully open position and maintain the valve member 22 in that position according to commands to the motor control circuit 41 from an engine control unit (ECU) or other engine management or emissions control system. BLDC motors of this type may be described as stepper motors. The motor control circuit 41 may be arranged in a separate protective enclosure and connected to the BLDC motor 32 by conductors extending into the motor housing from an electrical connector 39.

Figure 2:
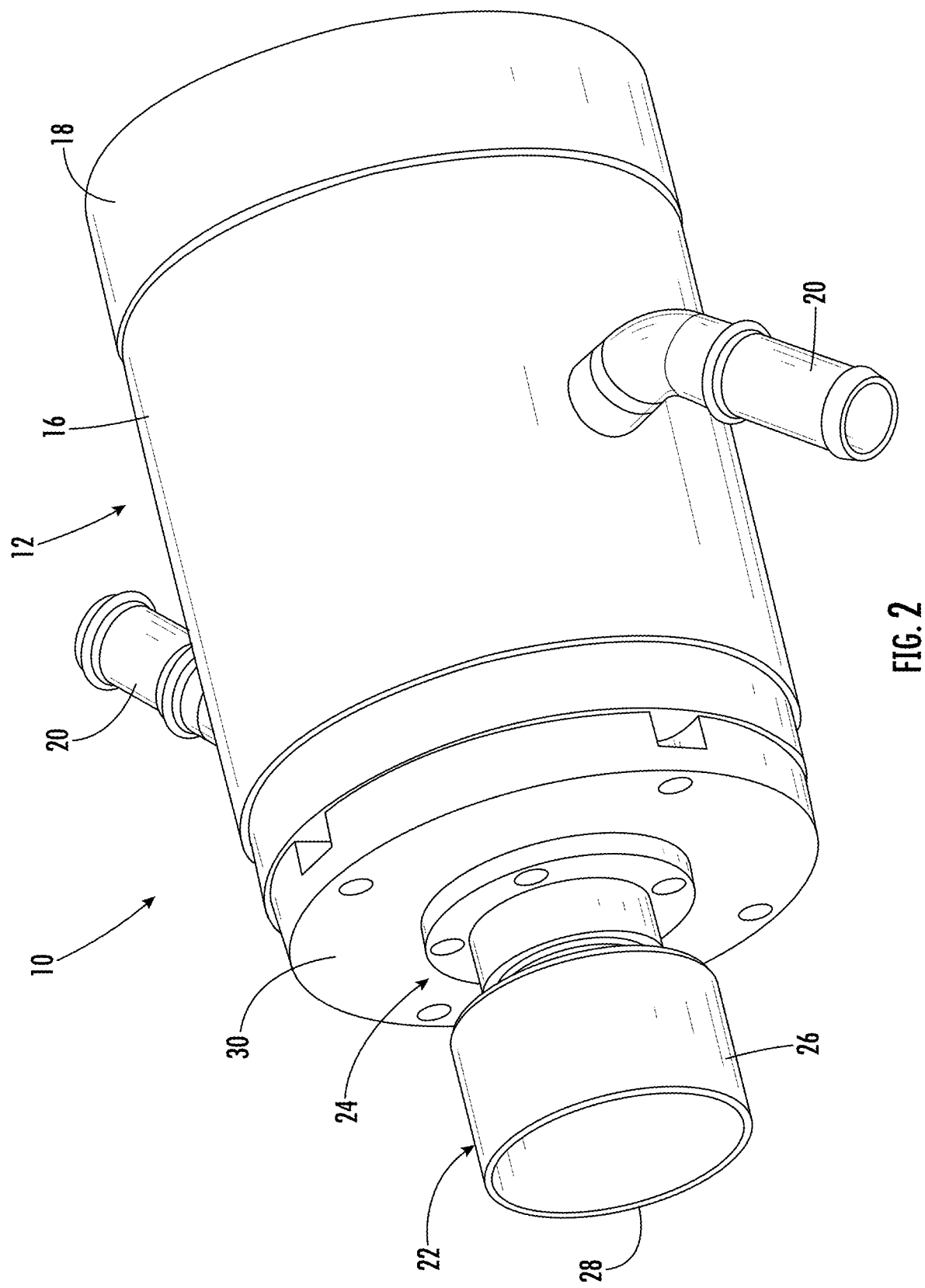
FIG. 2 is an exterior perspective view of the compact EGR valve of FIG. 1 with the valve body removed, showing the valve member in a retracted position.
Figure 3:
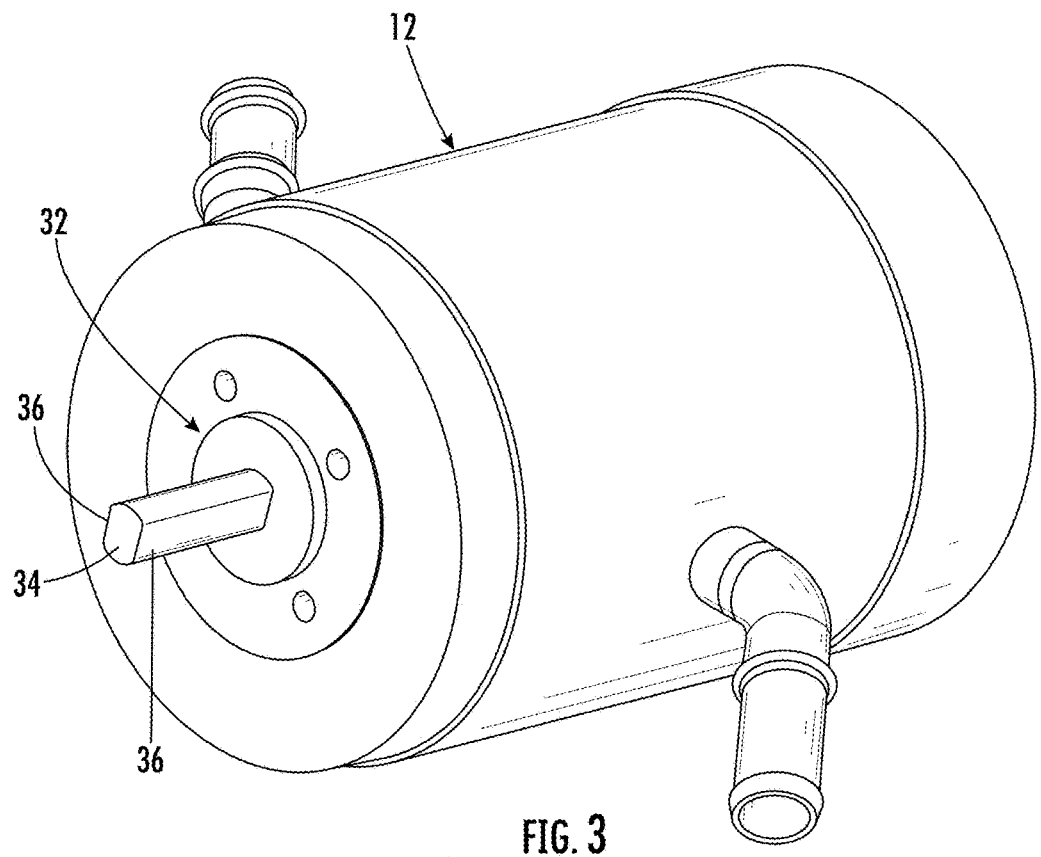
FIG. 3 is an exterior perspective view of the compact EGR valve of FIG. 2 with the valve member and mechanism for controlling movement of the valve member removed showing the motor shaft with two longitudinally extending flat surfaces.
Figure 4:
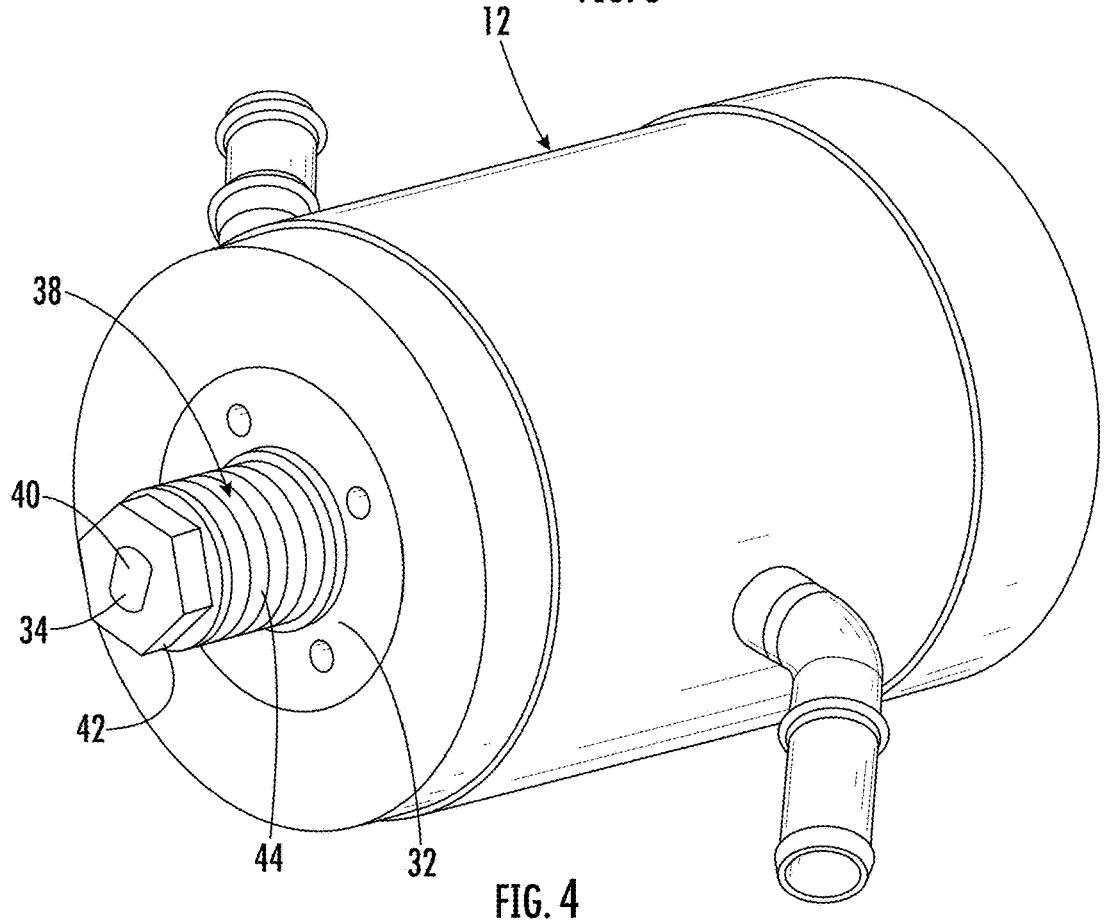
FIG. 4 is an exterior perspective view of the compact EGR valve of FIG. 3 showing a screw arranged to slide axially on the motor shaft.
Figure 5:
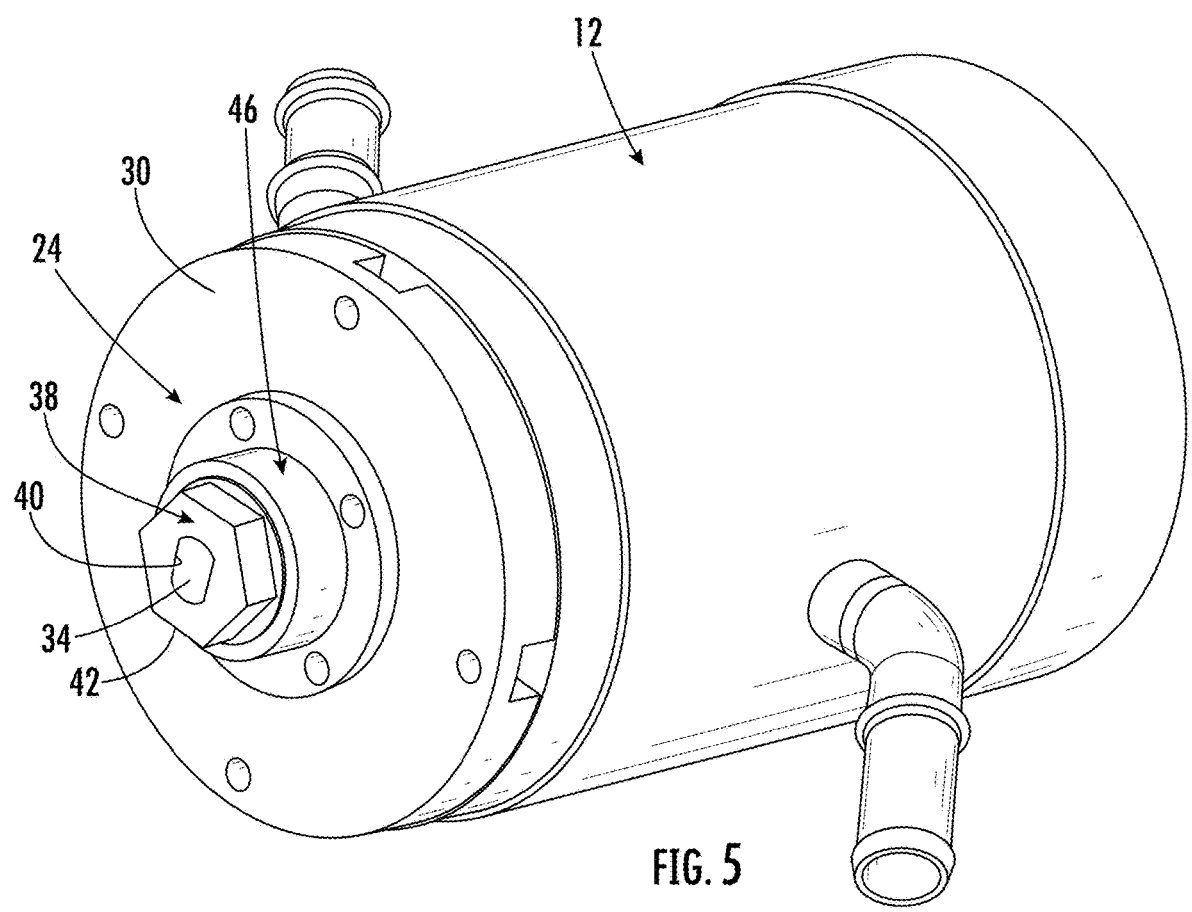
FIG. 5 is an exterior perspective view of the compact EGR valve of FIG. 4 showing a nut fixed to the motor and surrounding the screw so that rotation of the screw by the motor shaft generates rotational and axial movement of the screw relative to the nut.

FIG. 2 illustrates the compact EGR valve of FIG. 1 with the valve housing 14 removed to show the valve member 22 and valve member drive mechanism 24 connected to the motor assembly 12. The valve member 22 is rotationally symmetrical and in a disclosed embodiment has a cylindrical side surface 26 and an annular leading edge 28. The valve member 22 rotates as it moves axially from a closed (extended) position to an open (retracted) position when power is applied to the stator coils. FIG. 2 illustrates the valve member 22 in the open (retracted) position. An adaptor plate 30 connects the valve member drive mechanism 24 to the motor assembly 12. FIG. 3 shows the motor assembly 12 with the adaptor plate 30 and valve member drive mechanism 24 removed to show one end of the BLDC motor 32 and the motor shaft 34. The motor shaft 34 extends through the BLDC motor 32 and protrudes from both ends of the BLDC motor 32. One end of the shaft 34 extends into a chamber defined by the end cap 18 and is coupled to a torsion spring 50 contained within the end cap 18 to tighten (wind) the torsion spring 50 when the power is applied to the BLDC motor 32 to rotate the rotor 33 and shaft 34, and when power is removed from the BLDC motor 32, the torsion spring 50 releases its tension (unwinds) to counterrotate the rotor 33, shaft 34 and valve member 22. As shown in FIGS. 3-5, the motor shaft 34 has flats 36 on opposite sides. FIG. 4 illustrates a screw 38 having a longitudinally extending bore 40 configured to receive the motor shaft 34. The complementary configuration of the bore 40 and the motor shaft 34 allow the motor 32 to deliver rotational torque to the screw 38 while allowing the screw 38 to move axially along the shaft 34. An axial end portion 42 of the screw 38 has a polygonal configuration that mates with a complementary opening on the valve member 22 so that the valve member 22 and the screw 38 rotate together. The illustrated end portion 42 has a hexagonal configuration but any coupling capable of connecting the valve member 22 to the screw 38 so they rotate and move axially together is compatible with he disclosed compact EGR valve 10. The screw 38 has a threaded exterior surface 44. FIG. 5 illustrates the adaptor plate 30 supporting a nut 46 in a fixed position relative to the motor assembly 12. The nut 46 has a thread on its inside diameter complementary to the threaded exterior surface 44 of the screw 38. In the illustrated drive mechanism 24, the screw 38 is rotated by the motor shaft 34 and the threaded engagement of the screw 38 with the nut 46 cause the screw 38 to move axially along the motor shaft 34 rotating the valve member 22 and moving the valve member 22 axially with the screw 38. Although a threaded engagement of the screw 38 and nut 36 is disclosed, a ramp or other engagement that produces rotation and axial movement of the screw 38 relative to the nut 46 may also be used. FIG. 5 illustrates the screw 38 in a retracted position relative to the nut 46. The retracted position of the screw 38 illustrated in FIG. 5 requires powered rotation of the rotor 33 and motor shaft 34 against the force of the torsion spring 50 and friction of the valve actuation mechanism 24 and valve 22 in the valve chamber 56. The retracted position of the screw 38 corresponds to an open position of the valve member 22 in the valve chamber 56. The pitch of the threaded or ramp connection between the screw 38 and nut 46 determines the amount of axial movement of the nut 38 (and coupled valve member 22) relative to the nut 46 for each rotation of the motor shaft 34. The predetermined relationship of valve axial movement to motor rotation can be used to control the BLDC motor 32 to move the valve member 22 from the closed position to the fully open position or any position between the closed and fully open position. The disclosed compact EGR valve 10 is a "normally closed" valve that is returned to the closed position by the torsion spring 50 when power is not applied to the BLDC motor 32.

Figure 6:
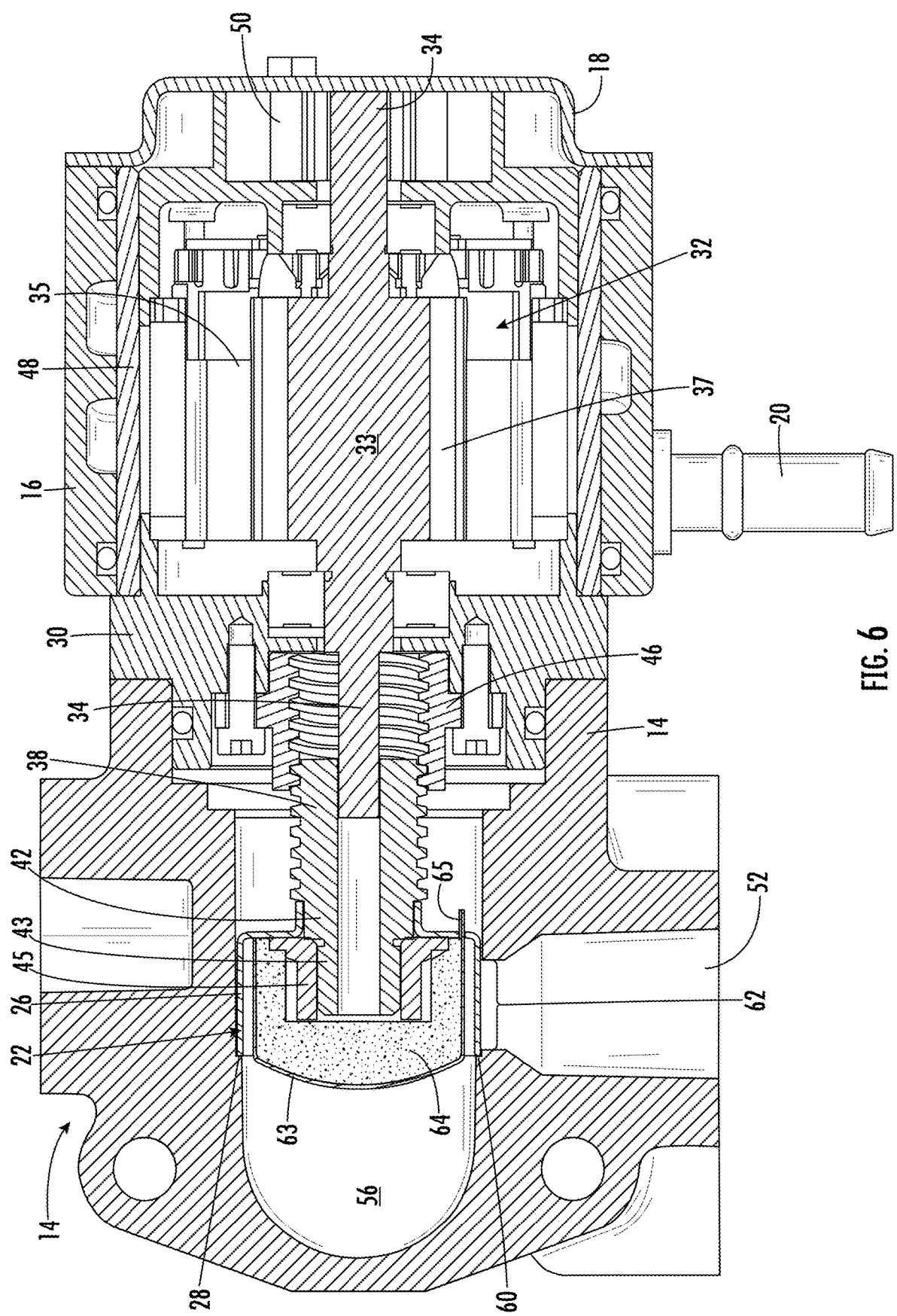
FIG. 6 is a longitudinal sectional view through a compact EGR valve according to aspects of the disclosure.
Figure 7:
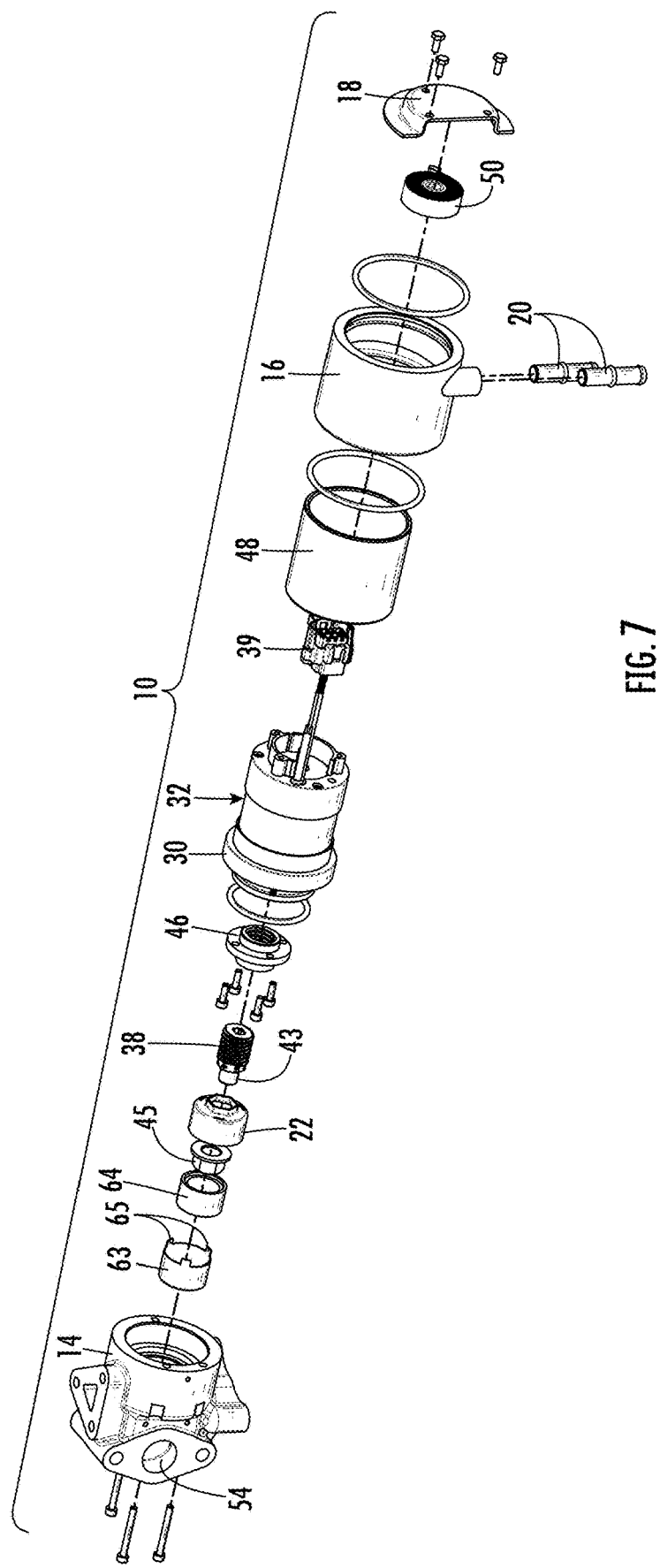
FIG. 7 is an exploded perspective view of the compact EGR valve of FIG. 6.

FIG. 6 shows the motor assembly 12 including the valve actuation mechanism 24 in functional conjunction with the valve member 22 and valve housing 14. FIG. 7 is an exploded perspective view of an embodiment of a compact EGR valve according to aspects of the disclosure. The adaptor plate 30 supports the BLDC motor 32 within an inner cooling jacket 48. The inner cooling jacket 48 is surrounded by and sealed to the cooling jacket 16 so that coolant can be circulated through openings defined by the cooling jacket 16 to cool the BLDC motor 32. A torsion spring 50 is contained in the end cap 18 and coupled to the motor shaft 34 to rotate the motor shaft 34 in a direction to move the valve member 22 to the closed (extended) position when power is removed from the BLDC motor 32. The torque of the BLDC motor 32 must be sufficient to overcome the rotational bias of the torsion spring 50 and the friction of the drive mechanism 24 and valve member 22. The nut 46 is secured in a fixed rotational and axial position relative to the adaptor plate 30, while the screw 38 rotates with the motor shaft 34 and is moved axially along the motor shaft 34 by threaded engagement with the nut 46. FIG. 6 illustrates the screw 38 and valve member 22 in the closed (extended) position. The disclosed valve actuation mechanism 24 produces simultaneous axial and rotational movement of the valve member 22.

FIGS. 6 and 7 illustrate one manner of connecting the valve member 22 to the screw 38. An end portion 42 of the screw 38 has a polygonal shape that fits with a complementary opening in a rear end of the valve member 22 to that the screw 38 and valve member 22 rotate and move axially together. In a disclosed configuration, the outer end of the screw 38 includes a protrusion 43 and a retainer 45. The protrusion 43 may be threaded and the retainer 45 may be a nut with a thread complementary to the protrusion 43. A thread 45 in the retainer may be distorted to lock the retainer 45 to the protrusion and prevent loosening of the retainer 45 from the protraction 43. The valve member 22 may be configured to allow for limited movement relative to the screw 38 to allow the valve member to self-center relative to the valve chamber inside surface and the shoulder 60. Alternative configurations of a protrusion 43 and retainer 45 may be used to permanently couple the valve member 22 to the screw 38. As shown in FIGS. 6 and 7, the center of the valve member 22 is occupied by a domed heat shield 63 and insulation 64. After the valve member 22 is joined to the screw 38, the insulation 64 is placed in the heat shield 63 and the heat shield 63 is coupled to the valve member 22 by inserting tabs 65 through corresponding slots in the valve member 22. The tabs 65 may be bent radially inwardly to secure the heat shield 63 to the valve member 22 with the insulation 64 filling the heat shield 63. The insulation 63 may be preformed mineral wool, fibrous mineral wool, or other suitable heat resistant insulating material. The assembled valve member 22, screw 38, heat shield 63 and insulation 64 can then be engaged with the nut 46 as shown in FIG. 2 before connection of the valve housing to the motor assembly 12.

The valve housing 14 defines a valve chamber 56, an exhaust gas inlet 52, an exhaust gas outlet 54, and an annular shoulder 60 that defines the closed (extended) position of the valve member 22 and can also be described as a valve seat. The valve chamber 56 includes a cylindrical portion 58 within which the valve member 22 moves between the closed (extended) position and the open (retracted) position. An inlet opening 62 to the valve chamber 56 has a rectangular configuration in the illustrated embodiment, but other inlet opening configurations may be used. An advantage of a rectangular inlet opening is that the long sides of the rectangular opening can be arranged parallel to the annular leading edge 28 of the valve member 22. In this configuration, axial movement of the valve member 22 from the closed position to the open position produces a linear opening of the inlet opening 62. The linear opening of the inlet opening 62 and the known axial movement of the valve member per rotation of the motor shaft 34 allows for a relatively simple control algorithm for the disclosed compact EGR valve 10. In the closed (extended position) where the annular leading edge 28 of the valve member 22 abuts the annular shoulder 60, the side wall 26 of the valve member 22 completely covers the inlet opening 62. One significant advantage of a valve member 22 that rotates as it moves axially is that the annular leading edge will clean deposits off the side surfaces of the cylindrical portion 58 of the valve chamber 56 and the annular shoulder 60. This cleaning action of the rotating valve member 22 prevents the accumulation of excess deposits of carbon from the exhaust gasses passing through the valve chamber 56 and ensures reliable operation of the disclosed compact EGR valve 10. Any deposits removed from the valve chamber 56 by the valve member 22 are allowed to leave the valve chamber 56 via the outlet 54.

As shown in FIG. 6, the adaptor plate 30 supports the nut 46 and separates the motor 32 from the heat present in the exhaust gasses passing through the valve housing 14. The center of the valve member 22 is occupied by a domed heat shield 63 containing insulation fiber 64 such as mineral wool. The adaptor plate 30 has a sealed connection with the valve housing 14, which prevents escape of exhaust gasses from the compact EGR valve 10. The disclosed configuration of the compact EGR valve 10 protects the BLDC motor 32 from the exhaust gasses and cools the BLDC motor 32 to ensure reliable operation in the harsh environment immediately adjacent an internal combustion engine.

Figure 8:
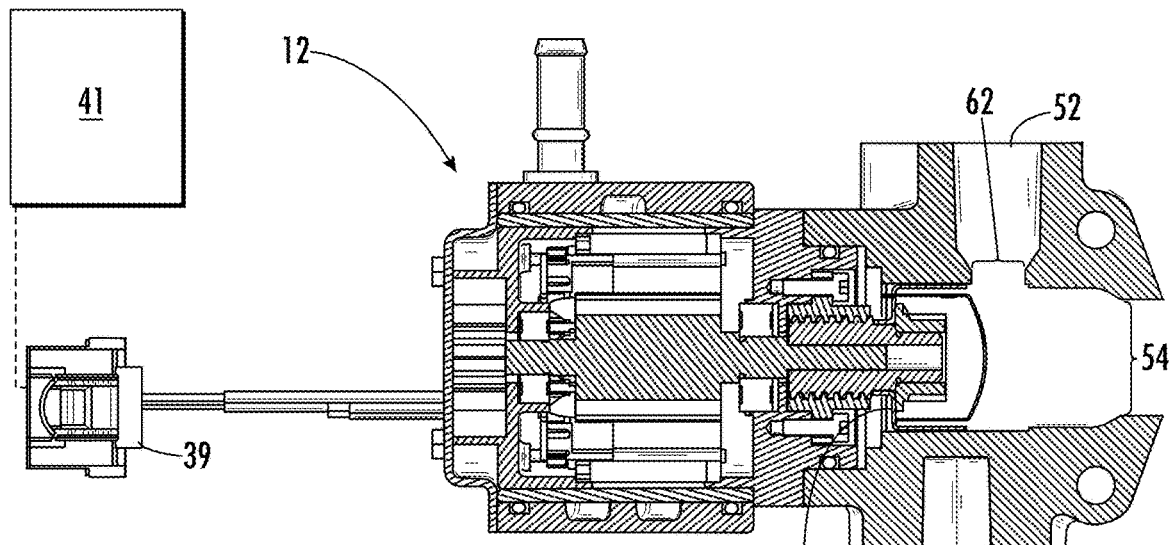
FIG. 8 is a longitudinal sectional view of an embodiment of a compact EGR valve illustrating a second opening to the valve chamber where the second opening is aligned with an axis of rotation of the valve member.
Figure 9:
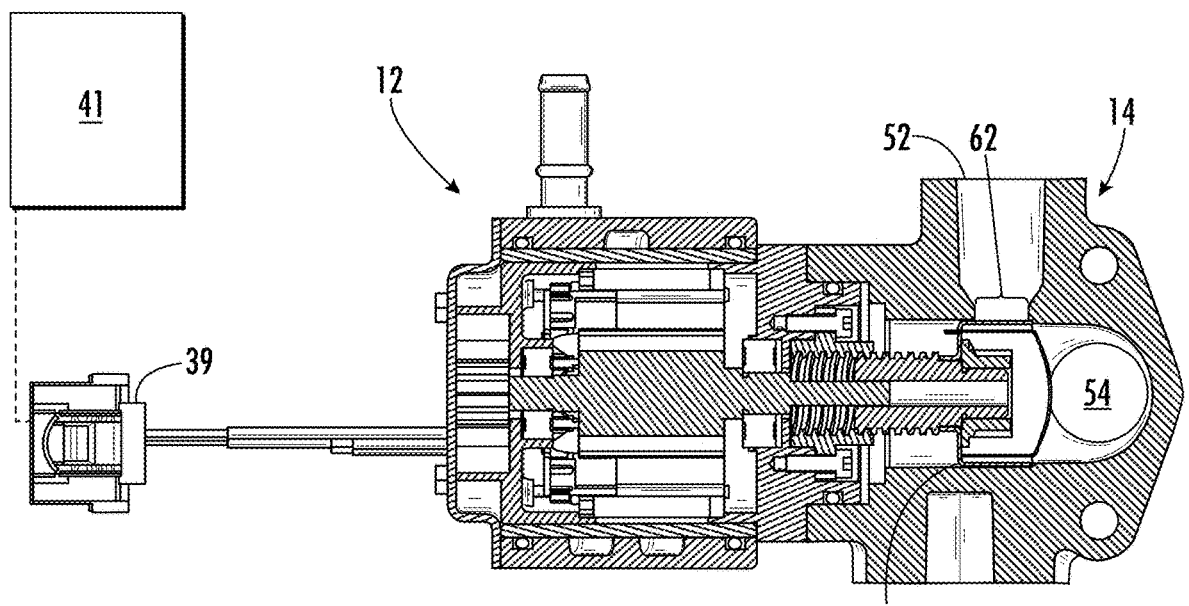
FIG. 9 is a longitudinal sectional view of an embodiment of a compact EGR valve illustrating a second opening to the valve chamber where the second opening has a radial orientation relative to the rotational axis of the valve member.

FIG. 8 is a longitudinal sectional view of the motor assembly 12 and drive mechanism 24 with the valve member 22 in the open (retracted) position. In this position, the screw 38 abuts a shoulder on the motor shaft 34 adjacent the end of the BLDC motor 32, as also shown in FIG. 6. FIG. 9 is a longitudinal sectional view of the motor assembly 12 and drive mechanism 24 with the valve member 22 in the closed (extended position). In this position, the screw 38 projects axially from the nut 46 and the annular leading edge 28 of the valve member 22 abuts the annular shoulder 60 within the valve chamber 56. Even though the screw 38 extends out of the nut 46 and only a small portion of the motor shaft 34 is within the screw 38, movement of the screw 38 and coupled valve member 22 are guided by sliding contact between the cylindrical outside surface 26 of the valve member 22 on the inside surface of the cylindrical portion 58 of the valve chamber 56. FIGS. 8 and 9 illustrate the rotationally coupled relationship between the screw 38 and the valve member 22. The torsion spring 50 coupled to the shaft 34 is wound up as the BLDC motor is energized to move the valve member 22 from the closed (extended) position of FIG. 9 to the open (retracted) position shown in FIG. 8. When power is removed from the BLDC motor 32, the torsion spring 50 unwinds to rotate the motor shaft 34 and return the valve member to the closed (extended) position. This valve configuration ensures that if power to the BLDC motor 32 is lost, the disclosed compact EGR valve 10 returns to the closed position.

Figure 11:
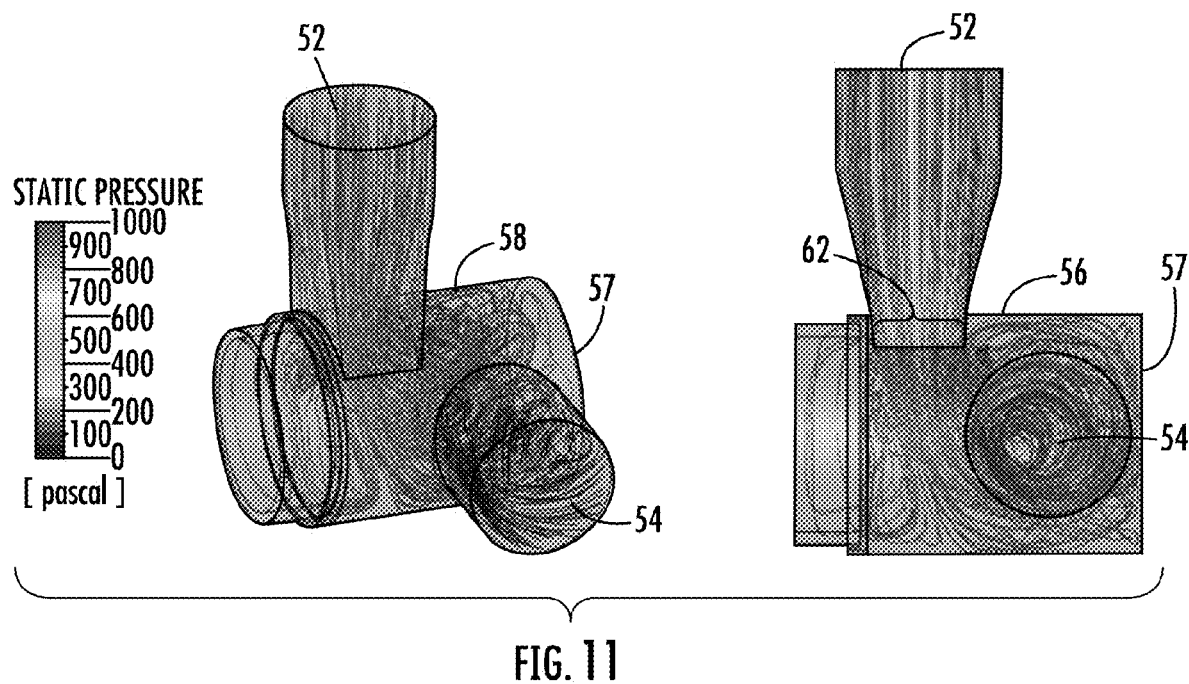
FIG. 11 is a model of a non-preferred valve housing configuration showing pressure drop from the inlet to the outlet of the valve housing.
Figure 12:
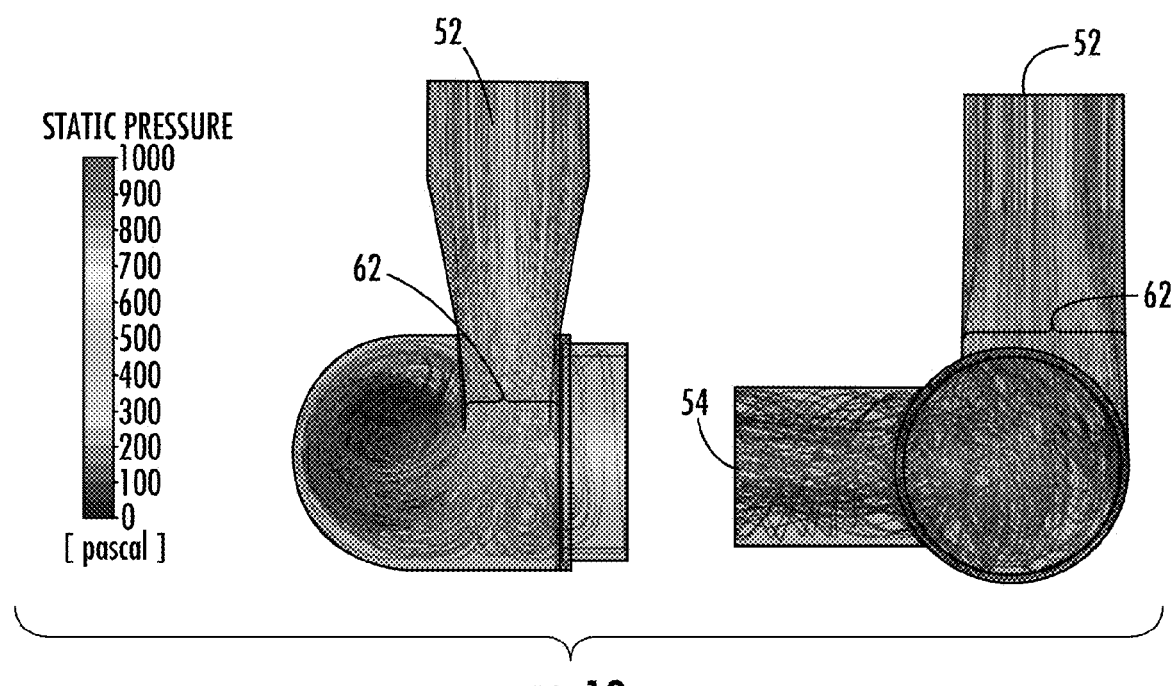
FIG. 12 is a model of a preferred valve housing configuration according to aspects of the disclosure showing reduced pressure drop from the inlet to the outlet of the valve housing.
Figure 13:
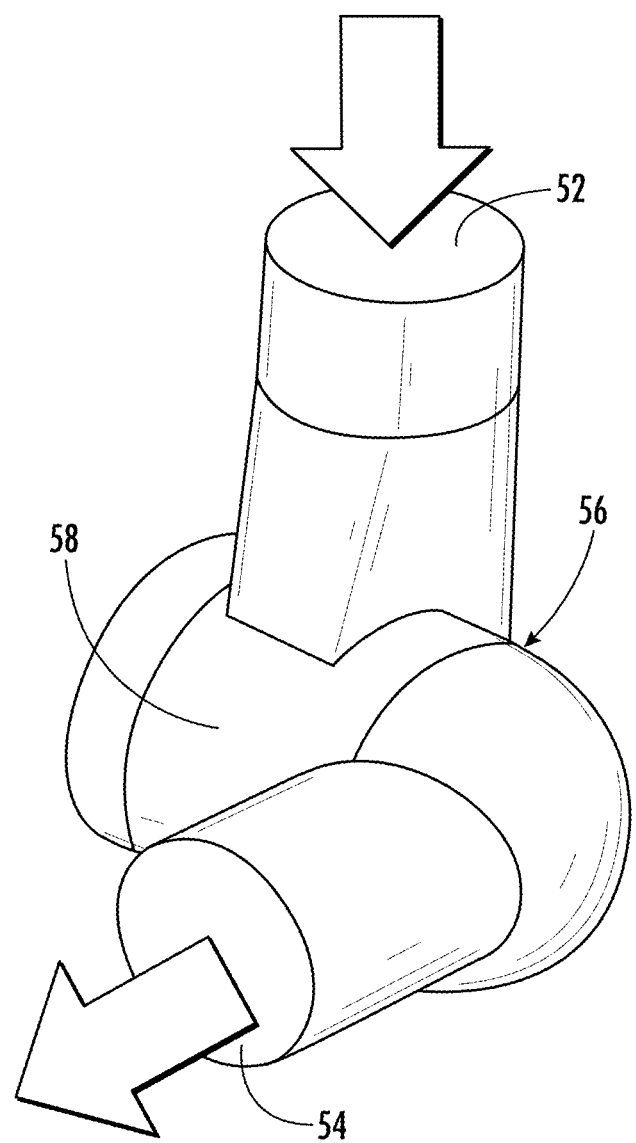
FIG. 13 is a model of the interior of a valve housing having the configuration and flow characteristics of the valve housing model shown in FIG. 12.

The configuration of the valve chamber 56 and the position of the inlet opening 62 within the cylindrical portion 58 of the valve chamber 56 ensure the smooth flow of exhaust gasses through the disclosed compact EGR valve 10. As shown in FIGS. 11 and 12, the inlet opening 62 is rectangular with the long sides of the rectangular opening 62 oriented parallel to the annular leading edge 28 of the valve member 22 and perpendicular to an axis of rotation of the valve member 22. One of the short sides of the rectangular opening 62 is coincident with an inner wall of the cylindrical valve chamber 56 as best seen in FIG. 12. The long sides of the rectangular opening 62 extend across a majority of the diameter of the cylindrical valve chamber 56. This configuration of the rectangular inlet opening 62 is offset from a central axis of the cylindrical valve chamber 56, with one short side joining an inside surface of the cylindrical valve chamber 56. This inlet opening configuration causes gas passing through the inlet opening 62 to form a vortex as shown in FIGS. 11 and 12. The rotation of the gas passing through the valve chamber 56 reduces a pressure drop through the disclosed compact EGR valve 10. FIG. 11 illustrates gas flow through one embodiment of a valve chamber having a flat end 57, while FIGS. 12 and 13 illustrate an embodiment of a valve chamber having a hemispherical end adjacent the outlet 54. The pressure drops shown in FIGS. 11 and 12 show that the hemispherical end of FIGS. 12 and 13 result in smoother flow and reduced pressure drop through the valve than the flat end valve chamber of FIG. 11.

Figure 10:
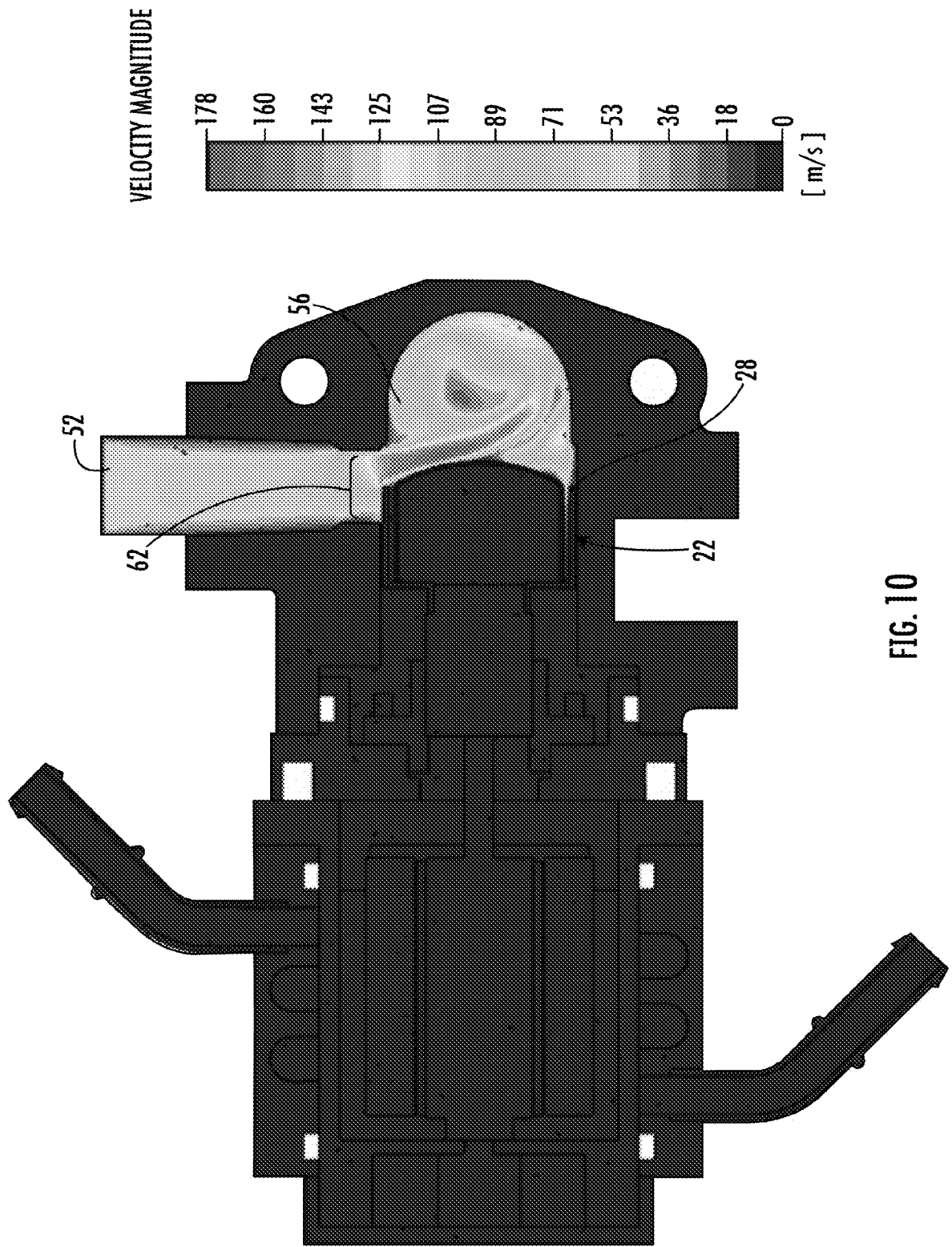
FIG. 10 is a longitudinal sectional view through the compact EGR valve of FIG. 9 showing the velocity of gas flow through the valve housing.

The rectangular opening 62 has a length in the axial direction of movement of the valve member 22 corresponding to the short sides of the rectangular opening. As shown in FIG. 6, the axial length of the cylindrical side wall 26 of the valve member 22 is sufficient to span the axial dimension of the rectangular inlet opening 62 and overlap with the inside wall of the valve chamber 56 at both ends of the inlet opening 62 in the axial direction. The inlet opening 62. FIGS. 6 and 10 illustrate the domed heat shield 63 inward of the annular leading edge 28 of the valve member 22. The dome of the heat shield 63 is arranged to direct gas flow toward the outlet 56 as shown in FIG. 10. The disclosed domed shape of the heat shield 63 and its axial position relative to the annular leading edge 28 of the valve member 22 reduce turbulence of gas passing the annular leading edge 28 and promote smooth flow of gas through the disclosed compact EGR valve 10. FIG. 11 illustrates gas flow through one embodiment of a valve chamber having a flat end 57 FIG. 10 is a longitudinal sectional view through the compact EGR valve 10 with the valve member 22 at a position partially opening the inlet opening 62. The velocity of gas passing through the valve chamber 56 is illustrated, with red indicating high velocity and blue indicating low velocity. Gas passing through the valve chamber 56 has its highest velocity as it passes the annular leading edge 28 of the valve member 22. This high velocity facilitates the removal of deposits from the annular leading edge 28 of the valve member 22 and helps to ensure reliable operation of the compact EGR valve 10.

FIGS. 11 and 12 compare gas flow through two differently configured valve chambers. In FIG. 11, the inlet 52 and inlet opening 62 are arranged at the center of the cylindrical portion 58 of the valve chamber 56. Further, the cylindrical portion 58 of the valve chamber 56 ends in a flat end face 57. In this configuration, gas flow is turbulent and results in relatively high pressure drop across the valve chamber 56. Flow analysis shows that the flat end face 57 results in a valve chamber 56 with dead volume in the corners that hinder gas flow through the valve chamber 56 to the outlet 54. In FIG. 12, the inlet 52 and inlet opening 62 are offset to one side of the cylindrical portion 58 so that one edge of the inlet opening 62 is tangent to a side of the cylindrical potion 58 of the valve chamber 56. In this configuration, the offset flow of gas into the valve chamber 56 initiates a swirling motion of the gas that reduces turbulence and promotes gas flow. The end of the valve chamber 56 communicating with the outlet 54 is hemispherical, reducing the volume of the valve chamber 56 and promoting smooth flow of gases from the inlet opening 62 to the outlet 54. The swirling motion of the gas initiated by the offset inlet opening 62 continues as the gas passes through the hemispherical end portion of the valve chamber 56 to the outlet 54. The valve chamber configuration illustrated in FIGS. 12 and 13 results in improved gas flow through the disclosed EGR valve 10 and reduced pressure drop across the valve relative to the valve chamber configuration of FIG. 11.

What is claimed:

1. A valve comprising:
   a valve housing defining a valve chamber with an inlet opening communicating with a cylindrical portion of the valve chamber and an outlet opening communicating with the cylindrical portion of the valve chamber;
   a valve member within the cylindrical portion of the valve chamber, the valve member having a cylindrical side wall and an annular leading edge, the valve member moveable between a closed position where the cylindrical side wall covers the inlet opening and an open position where the cylindrical side wall does not cover the inlet opening;
   a drive mechanism comprising:
      a screw coupled to the valve member for axial and rotational movement with the valve member, said screw having a first thread and defining an axial bore;
      a nut secured in a fixed position and having a second thread engaged with said first thread so that rotation of the screw moves the screw and the valve member axially relative to the nut while rotating the valve member within the cylindrical portion of the valve chamber;
      a motor having a shaft received within the screw, said shaft having a constant non-round configuration along its length, said motor shaft received in the bore defined by the screw,
   wherein rotation of the motor shaft rotates the screw relative to the nut to move the screw and valve member axially relative to the nut and motor, said screw sliding along the shaft as the valve member moves axially between the closed position and the open position, said valve member rotating with the motor shaft and screw during axial movement.

2. The valve of claim 1, wherein said valve chamber includes a hemispherical portion extending from the cylindrical portion, said outlet opening located at least partially in said hemispherical portion.

3. The valve of claim 2, wherein said valve chamber includes an inward projecting shoulder against which the annular leading edge of the valve member sits when the valve member is in the closed position.

4. The valve of claim 1, wherein the cylindrical side wall of the valve member has an axial length greater than an axial length of the inlet opening.

5. The valve of claim 1 wherein the motor is a BLDC motor having a rotor and equipped with sensors that allow a control circuit to determined the rotational position of the rotor, from which rotational position the control circuit can determine an axial position of the valve member within the valve chamber.

6. The valve of claim 1, wherein the motor shaft extends from both ends of a rotor of the motor, said valve comprising a torsion spring coupled to the motor shaft to rotate the motor shaft in a direction that moves the valve member to the closed position when power is removed from the motor.

7. The valve of claim 1, wherein said valve member is cylindrical and a cylindrical insulator is arranged in a center region of the valve member.

8. The valve of claim 1, wherein the inlet opening is laterally offset from a longitudinal axis of the cylindrical portion of the valve chamber.

9. The valve of claim 1, wherein the inlet opening is rectangular and has long edges perpendicular to a longitudinal axis of the cylindrical portion of the valve chamber.

10. The valve of claim 9, wherein the annular leading edge of the valve member is parallel to the long edges of the inlet opening and one short edge of the inlet opening is coincident with a side surface of the cylindrical portion of the valve chamber.

11. The valve of claim 8, wherein the outlet is perpendicular to the longitudinal axis of the valve chamber and centered on the longitudinal axis of the valve chamber.

12. The valve of claim 1, wherein the inlet opening is rectangular and the outlet opening is circular.

13. The valve of claim 1, wherein the outlet is parallel with the longitudinal axis of the valve chamber and centered on the longitudinal axis of the valve chamber.

14. A method of regulating gas flow through the valve of claim 1, said method comprising:
  simultaneously rotating and moving the valve member in the cylindrical portion of the valve chamber between the closed position and a range of open positions wherein the cylindrical side wall uncovers at least a portion of the inlet opening in the cylindrical portion of the valve chamber;
  wherein said annular leading edge removes deposits from an inside surface of the cylindrical portion of the valve chamber as the valve member rotates and moves axially from the range of open positions to the closed position.

* * * * *